Patented Oct. 23, 1923.

1,471,614

UNITED STATES PATENT OFFICE.

EMERY E. LA DUKE, OF SALT LAKE CITY, UTAH.

LIQUID CLARIFIER.

Application filed April 27, 1921, Serial No. 464,928. Renewed August 13, 1923.

*To all whom it may concern:*

Be it known that I, EMERY E. LA DUKE, a citizen of the United States, residing at Salt Lake City, in the county of Salt Lake and State of Utah, have invented certain new and useful Improvements in Liquid Clarifiers, of which the following is a specification.

My invention relates to liquid filters or strainers, and has for its object to provide a simple and efficient device to strain and clarify gasoline and like liquids quickly, and particularly to clarify cleaning fluids such as gasoline and benzine by utilizing centrifugal force to pass the said liquids through a filter and separate solid particles which may be found therein from the liquid in order that the clarified liquid may be used over and over again.

These objects I accomplish with the device illustrated in the accompanying drawings, in which similar letters and numerals of reference indicate like parts throughout the several views, and as described in the specification forming a part of this application and pointed out in the appended claims.

Figure 3:
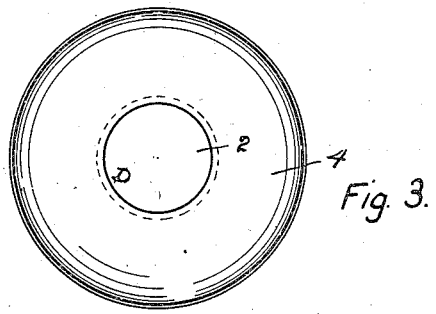
Figure 2:
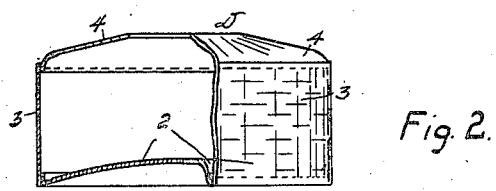
Figure 1:
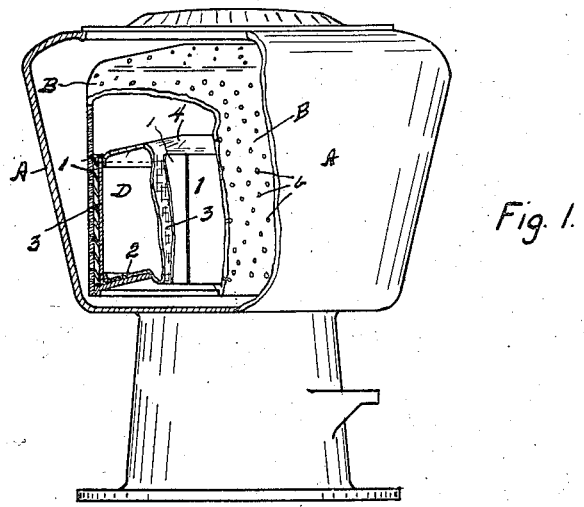

In the drawings in which I have shown a substantial embodiment of my invention Figure 1 is a side elevation of a centrifugal separator with portions cut away to show the filter and deflecting band in place therein. Figure 2 is an elevation of the filter, parts cut away. Figure 3 is a plan view of the filter.

When such fluids as benzine, gasoline and the like are used to clean clothing and other articles by washing them in the liquid, the said liquid when so used as a solvent for the grease, dirt and other strains thereon becomes saturated with such dirt and grease as to be worthless unless it can be cheaply and quickly filtered and clarified, and the present invention is to be used for clarifying such liquids so that they may be used for such and other purposes, and consists of the commonly used centrifugal separator A and the perforated basket B operated therein. Within the said basket B is placed a metal band 1 conforming and concentric with the interior wall and to close the perforations $b$ of the basket and to deflect the flow of the liquid upward through the partial top of the filter member D. The said band 1 is not continuous, in order that it may be easily placed in the basket or taken out. Also within the basket B and band 1 is placed a flexible fibre basket or filter D made of any heavy cloth or fibre material. The said filter D has a closed bottom conforming with the bottom of the separator A and resting thereon, shown at 2, and a vertical wall closely fitting the inner face of said band 1, as shown at 3, and with a partially closed annular top 4 having an opening circular or otherwise through which to introduce the liquid. The bottom 2 and side wall 3 are treated with some suitable composition to make them impervious to the liquid, while the top 4 is to act as the filter proper. The side wall and band 1 are not as high as the perforated basket and the liquid flows over the said band 1 and wall 3 and out through the perforations in the upper portion of the basket B, and is then caught for further use.

In operation I introduce the dirty liquid into the device through the top of the basket and filter, and, by rapidly rotating the basket B in which the filter is carried, centrifugal force causes the liquid to filter out through the meshes of the annular top of the filter while the particles of dirt are deposited against the wall 3. I have found that the surface of the textile wall of my filter acts as a friction element and tends to hold the solid particles as a deposit or precipitate against said wall much better than a smooth surface would. I have also found that the specific gravity of said solids will keep them from being deposited on said filter top 4 but will, when acted upon by centrifugal force, deposit them on the bottom and wall of my filter.

I thus provide a new and useful clarifier for liquid consisting of the flexible filter basket having its bottom and side walls closed or impervious to the liquid, and a foraminous annular top or filter, and a circular band all of which are to be used in connection with a centrifugal separator and perforated basket.

Having described my invention and its operation I desire to secure by Letters Patent and claim:—

1. A liquid clarifier comprising a casing within which is operated a perforated basket; a tight fitting band within said basket and contiguous its inner wall; and a flexible filter basket adapted to fit within said band having an impervious bottom and side wall and a foraminous top.

2. In a liquid clarifier the combination with a casing; a perforated basket operated within said casing; metal band concentric with and contiguous the inner wall of said basket of less height than the wall of said basket; and a flexible fibre basket having impervious bottom and side walls and a filter top, and to be used within said band and basket.

3. A liquid clarifier comprising a flexible cup shaped fibre basket, having its bottom and side wall impervious, and an annular top portion which is foraminous; with a metal band and bottom to hold said basket in shape and aid in making its bottom and side wall impervious.

4. A liquid clarifier comprising a flexible filter basket having impervious bottom and side walls, and a foraminous annular top therein.

In testimony whereof I have affixed my signature.

EMERY E. LA DUKE.